United States Patent [19]

Kulina

[11] 4,132,513

[45] Jan. 2, 1979

[54] ROTARY ENGINE COUNTERWEIGHT SYSTEM

[75] Inventor: Mark R. Kulina, Franklin Lakes, N.J.

[73] Assignee: Curtiss-Wright Corporation, Wood-Ridge, N.J.

[21] Appl. No.: 836,578

[22] Filed: Sep. 26, 1977

[51] Int. Cl.² .......................... F01C 1/02; F01C 11/00; F01C 21/00; F16C 3/06

[52] U.S. Cl. .................... 418/60; 418/61 A; 418/151; 74/603

[58] Field of Search ............... 418/60, 61 A, 151; 74/603, 604

[56] References Cited

U.S. PATENT DOCUMENTS

| | | | |
|---|---|---|---|
| 2,817,980 | 12/1957 | Eberhard | 74/603 |
| 3,077,867 | 2/1963 | Froede | 418/60 |
| 3,452,643 | 7/1969 | Pratt | 418/151 |
| 3,528,319 | 9/1970 | Ishida | 74/603 |

Primary Examiner—John J. Vrablik
Attorney, Agent, or Firm—Arthur L. Frederick

[57] ABSTRACT

A rotary mechanism such as a rotary combustion engine, compressor, expansion engine or the like in which the shaft has a first counterweight diametrically opposed to the shaft eccentric on which the rotor is journaled and in which the shaft has sleeve-type bearings on opposite sides of said counterweight and a second counterweight is provided outboard of said bearings and disposed ahead of said shaft eccentric by an angle of approximately 90° as measured about the shaft axis in the direction of shaft rotation.

8 Claims, 6 Drawing Figures

ROTARY ENGINE COUNTERWEIGHT SYSTEM

BACKGROUND OF THE INVENTION

This invention relates to rotary mechanisms and more particularly to rotary combustion engines of the type disclosed in U.S. Pat. No. 2,988,065 issued on June 13, 1961 to Wankel et al. Although the invention is herein described in connection with a rotary combustion engine, it will be clear that the invention is equally applicable to similar rotary mechanisms designed for use as rotary compressors or rotary expansion engines.

In such a rotary engine, the engine shaft has a cylindrical eccentric portion on which a rotor member is journaled. The shaft eccentric and its rotor member are received within the cavity of the engine housing. The engine housing cavity has a multi-lobe peripheral surface which, particularly in the case of a combustion engine, preferably is substantially an epitrochoid and the rotor member has a generally polygonal peripheral surface with a plurality of circumferentially-spaced apex portions. These apex portions have sealing cooperation with the housing multi-lobe peripheral surface to form a plurality of working chambers between the housing and rotor member. The engine shaft is provided with counterweights placed 180° from the shaft eccentric to dynamically balance the shaft eccentric and the rotor member mounted on the shaft eccentric. The aforementioned Wankel et al patent and U.S. Pat. No. 3,891,357 granted June 24, 1975 to Davis et al and U.S. Pat. No. 3,077,867 granted Feb. 19, 1963 to Froede all show rotary engines with such counterweights.

It has been found, however, that when such a rotary engine is operated at high speeds, for example, over 6,000 rpm, that its housing is subject to excessive vibration.

SUMMARY OF INVENTION

It is an object of the invention to provide a rotary engine of the type described in which novel means are provided to minimize engine housing vibrations at high rotative speeds.

Excessive vibration of the engine housing at high speeds is considered to be caused by shaft bending resulting from the axial spacing of the conventional shaft counterweights from the shaft eccentric. In a conventional rotary engine, as disclosed in the aforementioned patents, the engine shaft is supported by bearings in the engine side housing and counterweights are disposed outboard of these bearings, that is, axially outwardly relative to the engine from these bearings. In addition, the engine shaft is also supported by bearings outboard of the usual counterweights. With this construction, the centrifugal forces on the engine counterweights causes the shaft to bend at high engine speeds thereby forcing housing vibrations and producing shaft bearing stresses.

It would appear from theoretic calculations that the shaft bending could be minimized by providing an additional counterweight on the shaft outboard of each of the aforementioned outboard bearings with the additional counterweights being disposed rotationally in phase with the conventional counterweights, that is, 180° from the shaft eccentric. It has been found, however, from experimental tests that in order to minimize housing vibrations at high engine speeds, each such additional counterweight should be disposed rotationally ahead of the shaft eccentric in the direction of shaft rotation by an angle of about 80° to 120°, preferably approximately 90°. This shift from the theoretical position of each such additional counterweight is believed to be due to damping characteristics of the sleeve-type bearings normally used in such rotary engines.

Accordingly, in such a rotary engine in which the engine shaft has a counterweight axially spaced from and rotatively displaced 180° from the shaft eccentric with the shaft being supported on bearings disposed on both axial sides of the shaft counterweight, it is an object of the invention to provide an additional counterweight outboard of said shaft bearings and placed 80° to 120° rotatively ahead of the shaft eccentric in the direction of shaft rotation.

Other objects of the invention will become apparent upon reading the annexed detail description in connection with the drawings.

DESCRIPTION OF PREFERRED EMBODIMENTS

Figure 1:
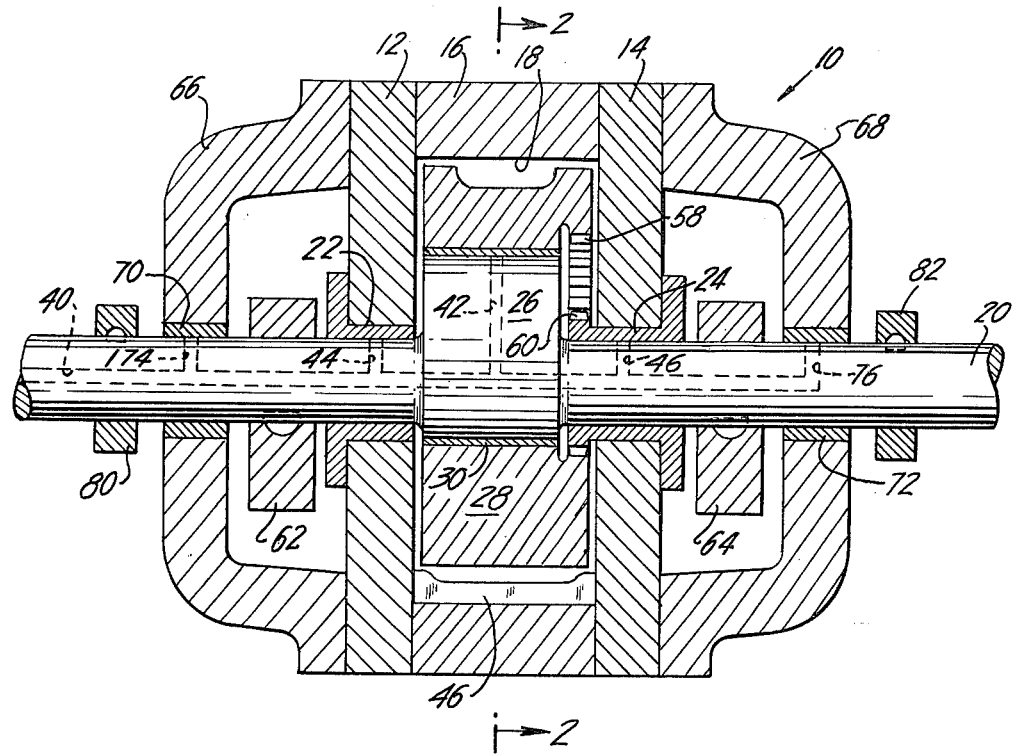
FIG. 1 is an axial sectional view of a rotary engine embodying the invention.
Figure 2:
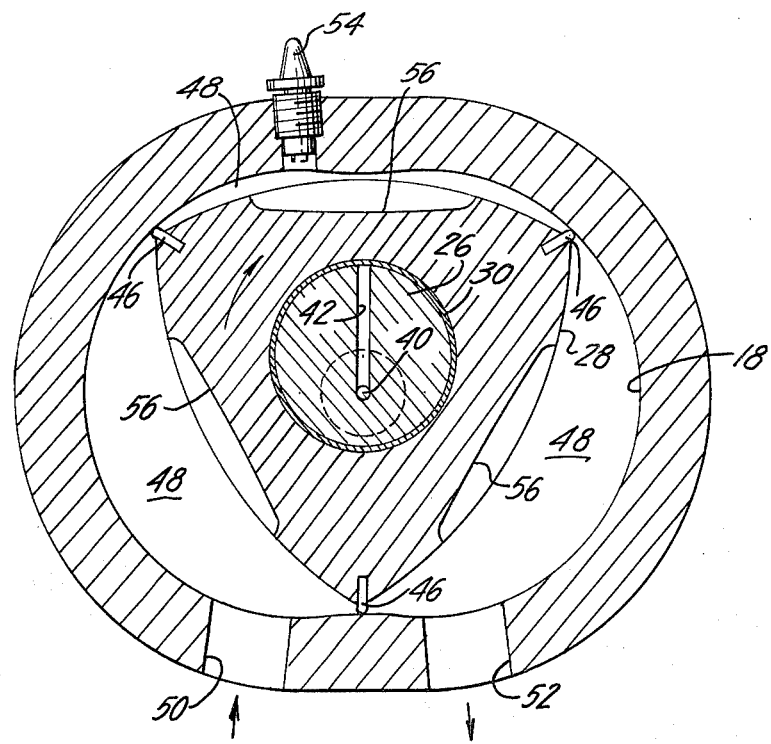
FIG. 2 is a sectional view taken along line 2—2 of FIG. 1.

Referring first to FIGS. 1 and 2 of the drawing, there is illustrated a single unit rotary combustion engine 10 having a housing including axially-spaced side walls 12 and 14 and a peripheral wall 16, said walls being secured together to form an engine cavity therebetween. The inner peripheral surface 18 of the wall 16 has a multi-lobe profile which, in the case of an engine, preferably is substantially an epitrochoid. In the engine shown, the surface 18 is a two-lobed epitrochoid. As will be apparent, however, the invention is not so limited.

The engine 10 has a shaft 20 which extends co-axially through the side walls 12 and 14 and said side walls being provided which sleeve-type bearings 22 and 24 for supporting the engine shaft 20. The shaft 20 has a cylindrical eccentric portion 26 disposed within the engine cavity and a rotor member 28 is journaled on the shaft eccentric portion. For this purpose the rotor member 28 has a coaxial bore therethrough and a sleeve-type bearing 30 is disposed between the rotor 28 and shaft eccentric 26 for rotatively supporting the rotor on said eccentric. Lubricating oil is supplied to rotor bearing 30 as well as to the shaft bearings 22 and 24 from a passage 40 passing co-axially through the shaft 20 and branch passages 42 and 44.

The rotor 28 has a polygonal peripheral surface which has a plurality of circumferentially-spaced nose portions, each having a seal 46 extending axially thereacross for sealing engagement with its housing or peripheral wall 18 to form a plurality of working chambers 48 therebetween.

The engine housing is also provided with an intake port 50 and an exhaust port 52 adjacent to and on opposite sides of one of the junctions of the lobes of the housing peripheral surface 18 and in the case of a non-diesel rotary engine, a spark plug 54 would be provided adjacent to another of the lobe junctions. The engine rotor preferably is provided with trough-shaped recesses 56 on each of its working faces. Suitable timing gears 58 and 60 are also provided to control relative rotation of the engine rotor 28, the gear 58 being an internal gear secured to the rotor and the gear 60 being secured to the engine housing. Where, as illustrated, the housing peripheral surface 18 is a two-lobed epitrochoid and the rotor has a generally triangular periphery, the gears 58 and 60 have a gear ratio of 3:2. Suitable seals (not shown) are also provided between each side face of the engine rotor and the adjacent engine side wall 12 or 14.

In order to dynamically balance the inertia forces on the engine shaft 20 resulting from the shaft eccentric 26 and the rotor 28, said shaft is provided with a pair of counterweights 62 and 64 disposed on opposite sides of the shaft eccentric. The effective center of mass of the counterweights is 180° out of phase from the shaft eccentric 28 and the mass of the two counterweights and the radii of their centers of mass are such as to substantially, dynamically balance said inertia forces on the shaft 20.

The engine housing is also provided with two structural members 66 and 68 secured thereto and providing a cover over each of the counterweights 62 and 64. In addition, the cover members 66 and 68 support sleeve-type bearings 70 and 72 respectively to provide bearings for the shaft axially outwardly, i.e., outboard of the adjacent counterweights 62 and 64. The bearings 70 and 72 are provided with lubricating oil from the shaft supply passage 40 via branch passages 74 and 76 respectively.

With such a rotary engine the counterweights 62 and 64 serve to dynamically balance the inertia forces on the rotating shaft 20. However, because of the axial spacing of the counterweights 62 and 64 relative to the shaft eccentric 26 and rotor 28, the centrifugal forces of these elements, particularly at high speeds of 6,000 rpm and higher, cause significant bending of the shaft. This bending is illustrated, but much exaggerated for purposes of illustration, in the diagrammatic view of FIG. 3. As a result of this shaft bending, vibration forces are transmitted to the engine housing through the shaft bearings 22, 24, 70 and 72 thereby causing vibration of the engine housing and vibratory stresses in the shaft bearings.

Figure 3:
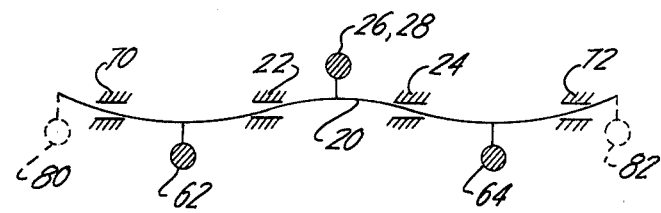
FIG. 3 is a diagrammatic view of the unbalance forces on a rotary engine shaft.
Figure 4:
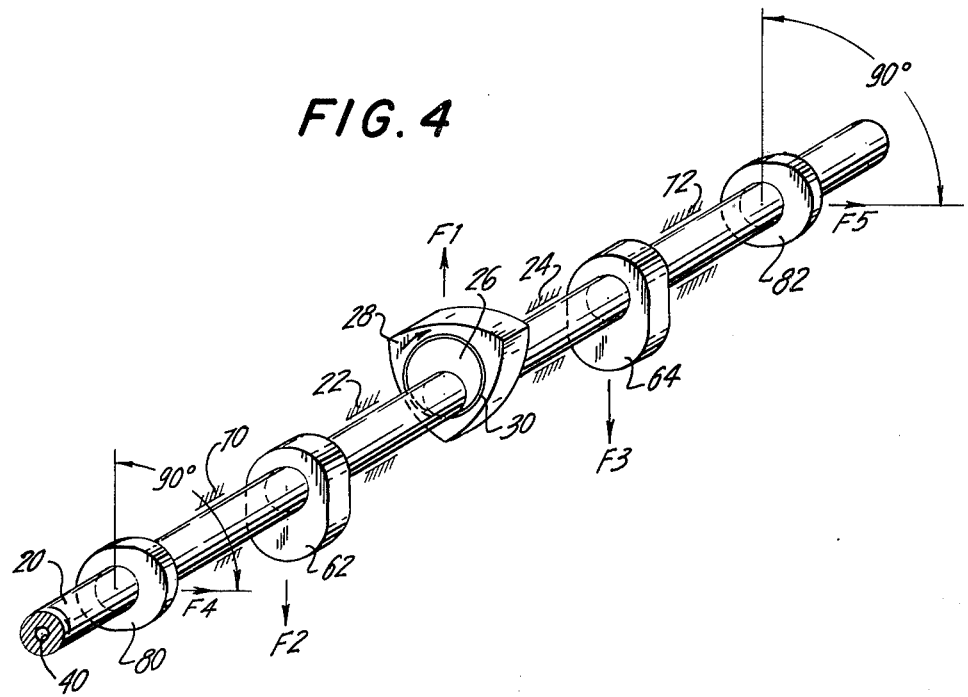
FIG. 4 is a schematic stretched out perspective view of the engine shaft of FIGS. 1 and 2.

As would appear from FIG. 3, and as can be determined from a theoretical analysis, this shaft bending should be minimized if relatively small additional counterweights 80 and 82 were added outboard of the bearings 70 and 72 in phase with the counterweights 62 and 64, respectively. Actually, however, placing the additional counterweights 80 and 82 in phase with the counterweights 62 and 64 did not reduce the housing vibration occurring at high shaft speeds. It has been determined, however, and verified by actual tests, that probably because of the damping characteristics of the shaft sleeve-type bearings, if the relatively small additional counterweights 80 and 82 are placed so that their centers of mass are approximately 80° to 120° ahead of the center of mass of the shaft eccentric 28, that housing vibration at high shaft speeds is materially reduced. Preferably this angle is approximately 90° and is so shown in FIG. 4. Thus, in FIG. 4 the arrows F1, F2, F3, F4 and F5 show the direction of the net centrifugal forces of the shaft eccentric 26 with its rotor 28, the counterweights 62 and 64 and the added counterweights 80 and 82, respectively. As is apparent from FIG. 4, the centrifugal forces F5 and F4 of the additional counterweights 80 and 82 are 90° ahead, in the direction of shaft rotation, of the centrifugal force F1 of the shaft eccentric 26 and its rotor 28. As is also apparent from FIG. 4, the centrifugal forces F2 and F3 of the counterweights 62 and 64 are about 180° out of phase from the shaft eccentric.

The precise reason that locating the additional counterweights 80 and 82 approximately 90° ahead of the shaft eccentric 26 materially reduces housing vibration at high shaft speeds, is not clearly understood. It is believed, however, to be related to the damping characteristics of the sleeve-type bearings 22, 24, 30, 70 and 72.

The magnitude of the unbalanced centrifugal force required of the additional counterweights 80 and 82 for minimizing engine housing vibration at high shaft speeds is quite small relative to the centrifugal forces of the counterweights 62 and 64. Thus, the magnitude of the combined unbalanced centrifugal forces of the two counterweights 80 and 82 in an actual test was less than 1% of the magnitude of the combined unbalanced centrifugal forces of the two counterweights 62 and 64. The actual percentage depends on a number of factors, such as the flexibility of the shaft and on how high a speed the shaft is to be run. In any case, the centrifugal forces of each of the counterweights 80 and 82 should not be more than 2% of that of each of the counterweights 62 and 64. Therefore, the added counterweight do not have any significant adverse effect on the dynamic shaft balance provided by the counterweights 62 and 64.

As described in connection with FIGS. 1-4, the engine shaft 20 is provided with two additional counterweights, namely, counterweights 80 and 82 disposed at opposite ends of the shaft. If, however, the engine housing is supported by having one of the housing ends fixedly secured to a rigid supporting structure then, from the standpoint of minimizing vibration of the engine housing, such an additional counterweight would only have to be provided on the engine shaft at the other end of the housing, that is, at the housing end remote from said fixed supporting structure. However, even if the engine housing is so supported at one end, such additional counterweights (80 and 82) may be provided at both ends of the engine shaft to minimize stresses in the shaft bearings.

Figure 5:
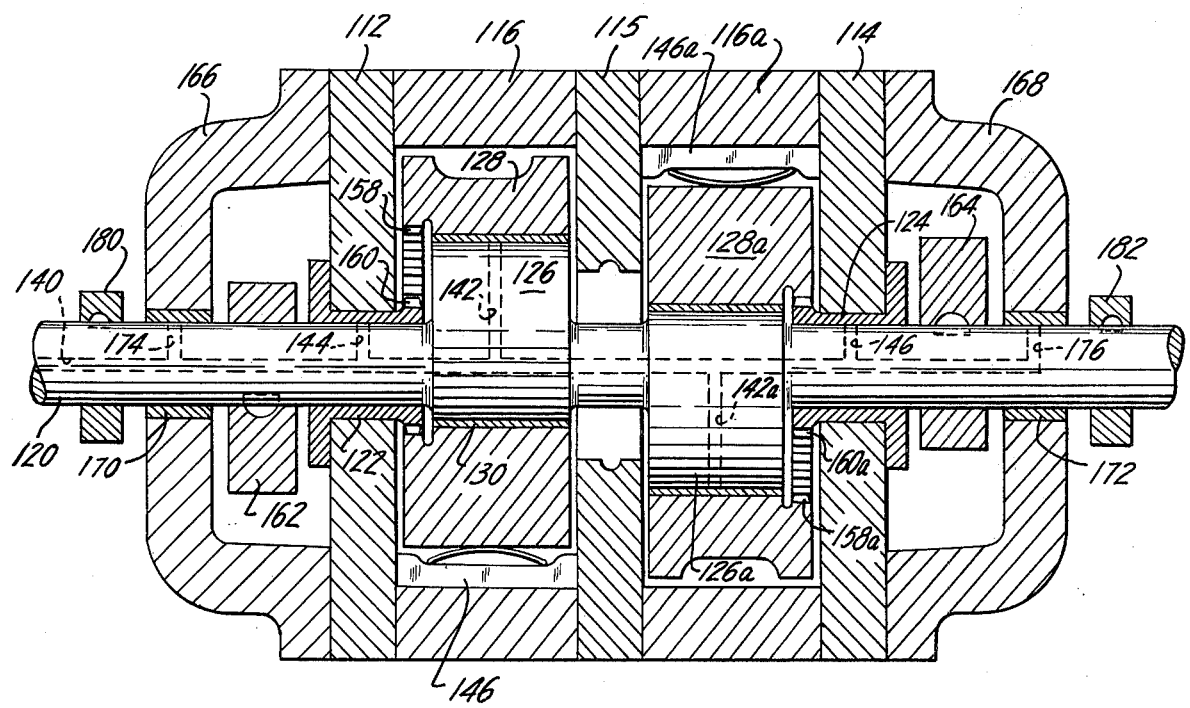
FIG. 5 is a view similar to FIG. 1 but showing the invention applied to a two-rotor engine.
Figure 6:
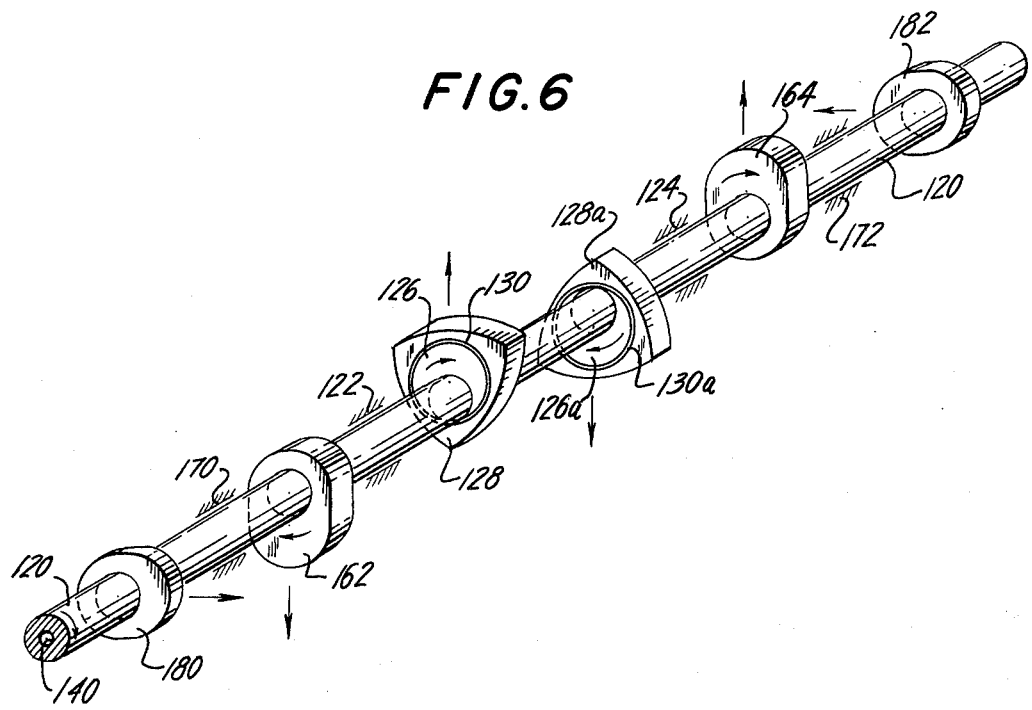
FIG. 6 is a schematic view similar to FIG. 4 but illustrating the engine shaft of FIG. 5.

The invention is also applicable to a two-rotor rotary engine as shown in FIGS. 5 and 6. For ease of understanding, the parts of FIGS. 5 and 6 have been identified by the same reference numerals as the corresponding parts of FIGS. 1-4 except 100 has been added thereto.

In FIG. 5, in order to form a second housing cavity, the engine side or end walls 112 and 114 are spaced further apart and an intermediate wall 115 is disposed therebetween with the peripheral wall 116 being disposed between the side wall 112 and intermediate wall 115 and a second peripheral wall 116a is disposed between the intermediate wall 115 and the other side wall 114. In this way, the intermediate wall 115 forms a side wall for both engine units. As illustrated, the two engine units are substantially identical and the parts of the second unit have been identified by the same reference numerals as the parts of the first unit but with a reference character a added thereto.

In FIGS. 5 and 6, the two shaft eccentrics 126 and 126a are 180° out of phase. Accordingly, the two counterweights 162 and 164 for substantially dynamically balancing the shaft 120 with respect to the shaft eccentrics 126 and 126a and their rotor members, are each 180° out of phase with their respective adjacent shafts eccentrics 126 and 126a. As a result, the two balancing counterweights 162 and 164 are not in phase, as are the two counterweights 62 and 64 of FIGS. 1-4, and instead are 180° out of phase. In FIGS. 5 and 6 the center of mass of the additional counterweights 180 and 182 are approximately 80°-120° ahead of the center of mass of these respective adjacent shaft eccentrics 126 and 126a. As in FIGS. 1-4, this angle preferably is about 90°. Also, as discussed in connection with the embodiment of FIGS. 1-4, if, for example, the engine housing of FIGS. 5-6 is rigidly supported at one end then only one of the two additional counterweights 180 or 182 may be required, namely, the additional counterweight 180 or 182 which is at the end of the engine housing remote from said rigid supporting structure.

In the embodiments described, the various counterweights have all been shown as separate elements. It is obvious, however, that, as is conventional in counterweights, any of the counterweights, could be formed as part of another element secured to the engine shaft, for example, as part of a gear or a flywheel.

While this invention has been described in connection with its preferred embodiments, it will be obvious to those skilled in the art, after understanding the invention, that various changes and modifications may be made therein without departing from the spirit and scope of the invention. The appended claims are intended to cover such modifications.

What is claimed is:

1. A rotary mechanism comprising:
   (a) a housing having axially-spaced first and second side walls and a peripheral wall disposed between said side walls to form an internal cavity having a multi-lobe peripheral surface;
   (b) a shaft co-axial with said cavity and extending through said side walls, said shaft having a cylindrical eccentric portion disposed within said cavity and said side walls providing a pair of sleeve bearings for supporting said shaft;
   (c) a rotor member having a co-axial bore therethrough for receiving said shaft eccentric and having a sleeve bearing for supporting the rotor member on said shaft eccentric within said cavity, said rotor member having a polygonal peripheral surface with a plurality of circumferentially-spaced apex portions having sealing cooperation with the multi-lobe peripheral surface of the housing to form a plurality of working chambers between said rotor member and housing;
   (d) a pair of counterweights secured to said shaft adjacent to opposite sides of the engine housing and disposed outboard of said pair of sleeve bearings and diametrically opposite to said shaft eccentric portion;
   (e) means secured to said housing and providing a second pair of sleeve bearings for said shaft outboard of said pair of counterweights; and
   (f) an additional counterweight secured to said shaft outboard of one of said second pair of sleeve bearings and disposed ahead of said shaft eccentric by an angle of from 80 to 120 degrees as measured about the shaft axis in the direction of shaft rotation and the unbalanced centrifugal force of said additional counterweight being small compared to that of either of said pair of counterweights.

2. A rotary mechanism as claimed in claim 1 in which said additional counterweight is disposed ahead of said shaft eccentric by an angle of approximately 90 degrees as measured about the shaft axis in the direction of shaft rotation.

3. A rotary mechanism as claimed in Claim 1 in which said first pair of counterweights substantially dynamically balances the shaft with respect to said shaft eccentric portion and its rotor member and in which the unbalanced centrifugal force of said additional counterweight is less than two percent of that exerted by the first pair of counterweights.

4. A rotary mechanism as claimed in claim 1 and including a second additional counterweight secured to the shaft outboard of the other of said second pair of sleeve bearings, said second additional counterweight being disposed ahead of said shaft eccentric by an angle of from 80 to 120 degrees as measured about the shaft axis in the direction of shaft rotation and the unbalanced centrifugal force of said second additional counterweight being small compared to that of either of said pair of counterweights.

5. A rotary mechanism comprising:
   (a) a housing having axially-spaced first side wall, an intermediate wall and a second side wall with a first peripheral wall disposed between said first side wall and intermediate wall to form a first engine cavity therebetween said intermediate wall and said second side wall to form a second engine cavity therebetween co-axial with said first cavity with each said peripheral wall having a multi-lobe peripheral surface;
   (b) a shaft co-axial with said first and second engine cavities and extending through said side walls, said shaft having first and second axially-spaced, diametrically-opposed cylindrical eccentric portions disposed within said first and second cavities respectively and said housing side walls providing a first pair of sleeve bearings for supporting said shaft;
   (c) first and second rotor members for said first and second engine cavities respectively, each rotor member having a co-axial bore therethrough for receiving the associated shaft eccentric portion and having a sleeve bearing for supporting said rotor member on its shaft eccentric portion, each rotor member having a polygonal peripheral surface with a plurality of circumferentially-spaced apex portions having sealing cooperation with the associated multi-lobe peripheral surface of the housing to form a plurality of working chambers between each of said rotor members and the housing;
   (d) a pair of counterweights secured to said shaft outboard of said housing side walls with each counterweight being disposed diametrically opposite to the adjacent shaft eccentric portion;
   (e) means secured to the housing and providing a second pair of sleeve bearings for said shaft outboard of said first and second counterweights; and
   (f) a third counterweight secured to said shaft outboard of one of said second pair of sleeve bearings and disposed ahead of the adjacent shaft eccentric portion by an angle of approximately 80 to 120 degrees as measured about the shaft axis in the direction of shaft rotation and the unbalanced centrifugal force of said additional counterweight being small compared to that of either of said pair of counterweights.

6. A rotary mechanism as claimed in claim 5 and including a second additional counterweight secured to the shaft outboard of the other of said second pair of sleeve bearings, said second additional counterweight being disposed ahead of the adjacent shaft eccentric by an angle of from 80 to 120 degrees as measured about the shaft axis in the direction of shaft rotation and the unbalanced centrifugal force of said second additional counterweight being small compared to that of either of said pair of counterweights.

7. A rotary mechanism as claimed in claim 5 in which said first pair of counterweights substantially dynamically balances the shaft with respect to the shaft eccentric portions and their rotor members and in which the unbalanced centrifugal force of said additional counterweight is less than two percent of that exerted by either of said first pair of counterweights.

8. A rotary mechanism as claimed in claim 7 in which said additional counterweight is disposed ahead of the adjacent shaft eccentric by an angle of approximately 90 degrees as measured about the shaft axis in the direction of shaft rotation.

* * * * *